R. ARTHUR.

SELF SEALING CAN.

No. 403. Reissued Oct. 14, 1856.

Witnesses.

J. H. B. Jenkins

J. Eshaw

Inventor.

R. Arthur

THE NORRIS PETERS CO., PHOTO-LITHO., WASHINGTON, D. C.

UNITED STATES PATENT OFFICE.

ROBERT ARTHUR, OF PHILADELPHIA, PENNSYLVANIA.

IMPROVEMENT IN SELF-SEALING CANS.

Specification forming part of Letters Patent No. 12,153, dated January 2, 1855; Reissue No. 370, dated June 10, 1856; Reissue No. 403, dated October 14, 1856.

*To all whom it may concern:*

Be it known that I, ROBERT ARTHUR of the city of Philadelphia, State of Pennsylvania, and late of the city and county of Washington, in the District of Columbia, have invented certain new and useful improvements in the method of constructing and closing vessels hermetically for domestic and other purposes, of which the following is a full, clear, and exact description, reference being had to to the accompanying drawings, which make part of this specification, and in which—

Figure 2:
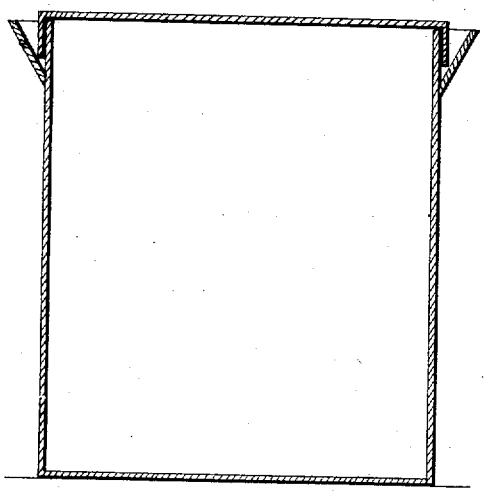
Figure 1:
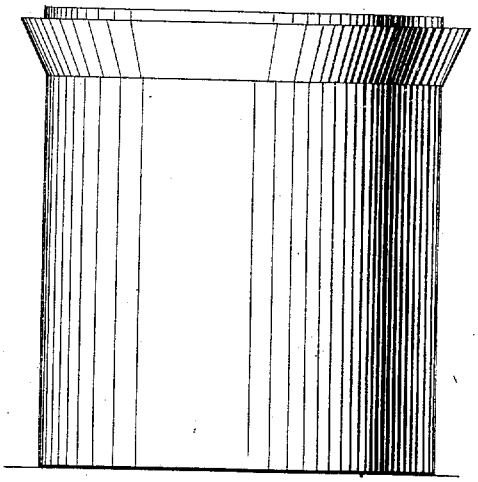
Figure 3:
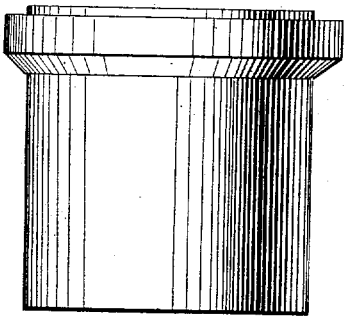
Figure 4:
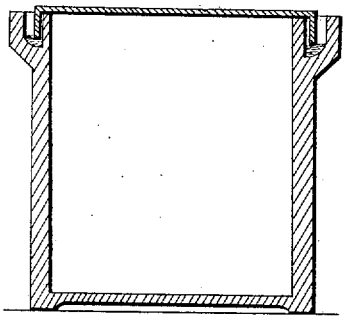

Figure 1 represents a side elevation, and Fig. 2 a vertical section, of a tin canister constructed upon my improved plan and hermetically sealed. Figs. 3 and 4 represent similar views of an earthen jar upon this plan with a tin lid, also hermetically sealed in place.

It is well known that certain perishable substances—such as fruits, vegetables, meats, &c.—may be preserved unchanged an indefinite length of time by first raising them to an elevated temperature, and while they are at this temperature sealing so effectually the lid upon the vessel in which they are contained as to cut them off completely from contact with the atmosphere. It is so desirable, for obvious reasons, that both vegetable and animal food should be preserved in this way that for some years past an extensive business devoted exclusively to the accomplishment of this object has been growing up. The vessels which have usually been employed for preserving meats and vegetables fresh are canisters of tinned iron, the lids of which are soldered on in a way well known at the moment when the temperature of the matter contained within them is raised to the proper point. This method has been found effectual for the purpose in view; but it is defective for general use in this respect: The process of soldering can only be successfully conducted, even for this simple purpose, by a person skilled in the art. It is therefore out of the reach of ordinary housewives or servants to accomplish the object in this way. It is also defective in this respect: When the vessel is once closed, it is by most persons found so difficult to open that it is usually injured by this operation to such an extent as to be rendered useless.

It is unnecessary to say that some cheap, convenient, and easy method within the power of every individual to use is an exceedingly desirable thing. Attempts have been made to supply this desideratum, but heretofore with imperfect success. By my simple invention the defects and difficulties attendant upon all the processes at present known are so entirely surmounted that, while but little is added to the cost of vessels constructed as I propose to make them over those of ordinary form, it places within the reach of every individual the means of accomplishing this important object with ease and convenience.

My invention consists in making vessels with an annular groove or receptacle at or near the outer edge of the top, furnished with a cover, the rim of which passes loosely into the groove. The groove may either be formed while the material of which the vessel is made is in a plastic state, if made of such material, or it may be added after the vessel is otherwise completed. The groove is to be filled with some composition which melts only at a higher temperature than that at which it is necessary to seal the vessel. After the groove has been filled with this composition, the vessel is complete.

In order to use these vessels for substances which for preservation must be heated up to or near the boiling-point, it is only necessary to heat the contents of the vessel to this point and put the cover in position, placing a weight upon it to maintain it in place until the cement hardens. The effect of the heat is simply to soften the composition so that the cover may be pressed among it into place without rendering it so fluid as to be driven into the vessel by the pressure of the external atmosphere as the contents cool down and a vacuum is formed in the interior. If deemed advisable, a hot iron may be rubbed round the cement in contact with the lid, to render its adherence to the latter more complete by a mere superficial melting of the cement.

It has been found by experience that vessels constructed with a simple groove and cover fitting imperfectly in it (as must be the case with all cheap vessels intended for common use) cannot be closed, while the contents are at an elevated temperature, by pouring into the groove any of the ordinary cements, or indeed any cement now known or used for such a purpose. It is found that the contents of the vessel lose heat more rapidly than the body of cement loses its fluidity, and as they cool down and contract in volume the pressure of the external atmosphere will drive the cement into the vessel, and continue to do so as rapidly as it is poured into the groove until the vacuum is filled or the temperature of the vessel is so reduced as to allow it to harden sufficiently to resist the atmospheric pressure. Another difficulty also occurs. After the cement hardens sufficiently to cease flowing into the canister by atmospheric pressure, gases generated from the substances contained in the canister will force their way through the cement, and thus leave vents or openings in it. This difficulty has been encountered and attempts made to remove it by means more or less expensive. Spratt's patent, lately issued, proposes to make a temporary joint by a gasket screwed down upon the top of the opening into the canister, in order to prevent the effect described from occurring. Now, the effects alluded to occur, as is quite evident, from the imperfection of the joint. If the lower edge of the cover were ground to a joint with the part of the groove it touches, it would simply be necessary to hold it in place for a few minutes until the cement hardens. The imperfection of the joint, however, may be remedied for this purpose by very simple means. If any elastic substance is packed into the bottom of the groove—such as a piece of raw cotton, a strip of cotton fabric of any kind, a piece of leather, or even a piece of newspaper cut of the proper size, rolled up, and placed in the bottom of the groove—it will effectually prevent the cement in its most fluid state from passing into the can, or any gas from escaping, if the cover is snugly retained *in situ* by means of a weight placed upon it.

In order to retain the cotton or other elastic packing in place, it is necessary that the sides of the groove should form an acute angle with the side of the vessel, as in Fig. 2, or be parallel to it for a considerable distance down, as shown in Fig. 4, that the elastic material may be properly retained in its place until the cement is thoroughly hardened, and also to prevent the elastic packing from being withdrawn from the groove when the lid is removed. This I have proved by actual experiment, and claim to have made this discovery, which, simple and obvious as it is, has remained undiscovered until now.

The means of closing the canister described may sometimes supersede the necessity of this process; but unless the cement is prepared with great care it is not so safe and reliable to depend upon the cement alone, in consequence of the imperfect quality of the cement, which, of course, cannot always be prepared under the supervision of a skillful person. For the purpose in view a simple, cheap, and efficient cement may be made of gutta-percha and common rosin, in proportions varying as the case may require, from half an ounce to three ounces of gutta-percha to the pound of rosin. Other compositions will doubtless answer the purpose, and perhaps equally well; but I prefer this.

When the canister or vessel is to be sealed at the boiling-point, the composition ought to contain a larger proportion of the rosin. The smallest quantity of gutta-percha indicated above is sufficient; but if the object is to preserve butter, or such articles as do not require to be heated at all, or only require a slight elevation of temperature, a larger proportion of gutta-percha should be used, and the cover heated by being immersed in boiling water or otherwise before it is put in place.

In order to open the vessels sealed as described, it is only necessary to heat slightly the part in which the cement is contained, in order to soften it sufficiently to allow the cover with slight effort to be removed. The means of accomplishing this object are so simple and various as not to require any particular description. The immersion for a few minutes of the upper part of the vessel in boiling water, or, if simple boiling water is not hot enough, boiling salt-water or heated oil, will fully answer. After the cover and contents of the vessel are removed, it may be cleansed and set aside for future use.

The vessel constructed as I propose (with the groove at the outer side of the top) offers the advantage of being perfectly accessible, and, as there is no obstruction or projecting obstacle from the bottom to the opening, can have its contents readily and perfectly removed and be thoroughly cleansed after the cover is removed, like any common cooking-utensil. This, though apparently a trifling change, must be seen to be a very useful feature.

Having thus described my invention, what I claim, and desire to secure by Letters Patent, is—

1. A vessel made with a groove to surround its mouth, prepared with cement, and ready for hermetical sealing; but to hermetical sealing itself I make no claim.

2. The employment of elastic packing arranged and retained by a groove of an acute form, or whose sides are in close proximity, in the manner and for the purpose above described.

R. ARTHUR.

Witnesses:
J. H. B. JENKINS,
I. E. SHAW.